United States Patent [19]

Ando

[11] 4,085,656
[45] Apr. 25, 1978

[54] VACUUM BOOSTER

[75] Inventor: Hiromi Ando, Tokyo, Japan

[73] Assignee: Tokico Ltd., Japan

[21] Appl. No.: 704,621

[22] Filed: Jul. 12, 1976

[30] Foreign Application Priority Data

Jul. 19, 1975 Japan .................................. 50-88486
Jul. 19, 1975 Japan ........................... 50-100333[U]

[51] Int. Cl.² ................................................. F15B 9/10
[52] U.S. Cl. ................................ 91/376 R; 91/369 B;
137/627 S
[58] Field of Search ............. 91/376 R, 369 R, 369 A,
91/369 B; 137/627.5

[56] References Cited
U.S. PATENT DOCUMENTS 3,082,745  3/1963  Brooks ..................... 91/376
3,387,455  6/1968  Eggstein .................. 91/376
3,478,519  11/1969  Eggstein ................. 91/376

Primary Examiner—Paul E. Maslousky
Attorney, Agent, or Firm—Wenderoth, Lind & Ponack

[57] ABSTRACT

A vacuum booster has a housing the interior of which is divided into a vacuum chamber and a pressure chamber, a plunger connected to an input rod and fitted slidably in a cylinder portion of a valve body, and valve seats defined respectively on adjacent ends of the plunger and the cylinder portion to cooperate with a seating surface of a valve member for controlling respectively the communication between the pressure chamber and the atmosphere and between the two chambers. A surface portion of the seating surface of the valve member with which at least one of the valve seats engages is a curved rotational surface.

11 Claims, 10 Drawing Figures

VACUUM BOOSTER

This invention relates to a vacuum booster, and particularly to a vacuum booster of the kind comprising a plunger slidably fitted in a cylinder portion of a valve body, valve seats defined respectively by adjacent ends of the cylinder portion of the valve body and the plunger, a poppet type valve member cooperating with the two valve seats for controlling communication between two chambers defined in the housing of the vacuum booster and between at least one of the spaces and the atmosphere.

The poppet type valve member used in prior art vacuum boosters of the aforementioned kind has a seating surface extending in a plane perpendicular to the axis of the booster for cooperating with the two valve seats and there is not provided any guides for guiding axial movement of the valve member. Therefore the seating surface will sometimes move or displace radially which impairs sealing engagement between the valve member and the valve seats.

Further, when the valve body of the vacuum booster is formed of phenol resin, there is provided ample clearance between the cylindrical portion of the valve body and the plunger to accommodate thermal expansion or shrinkage of the valve body. Thus, the concentricity between the valve body and the plunger will not necessarily be maintained, and the two valve seats cannot simultaneously attain sealing engagement between the valve seats and the seating surface of the valve member, which is required to hold the vacuum booster in a balanced condition.

An object of the present invention is to provide an improved vacuum booster of the aforementioned kind in which the poppet type valve member has a seating surface adapted to engage with the two valve seats so as to maintain the concentricity therebetween.

According to the present invention the seating surface of the valve member is a curved revolutional surface, so that concentricity between the valve seats of the plunger and the valve body and the seating surface of the valve member is automatically maintained.

The present invention will now be further described with reference to the accompanying drawings, in which.

Figure 1:
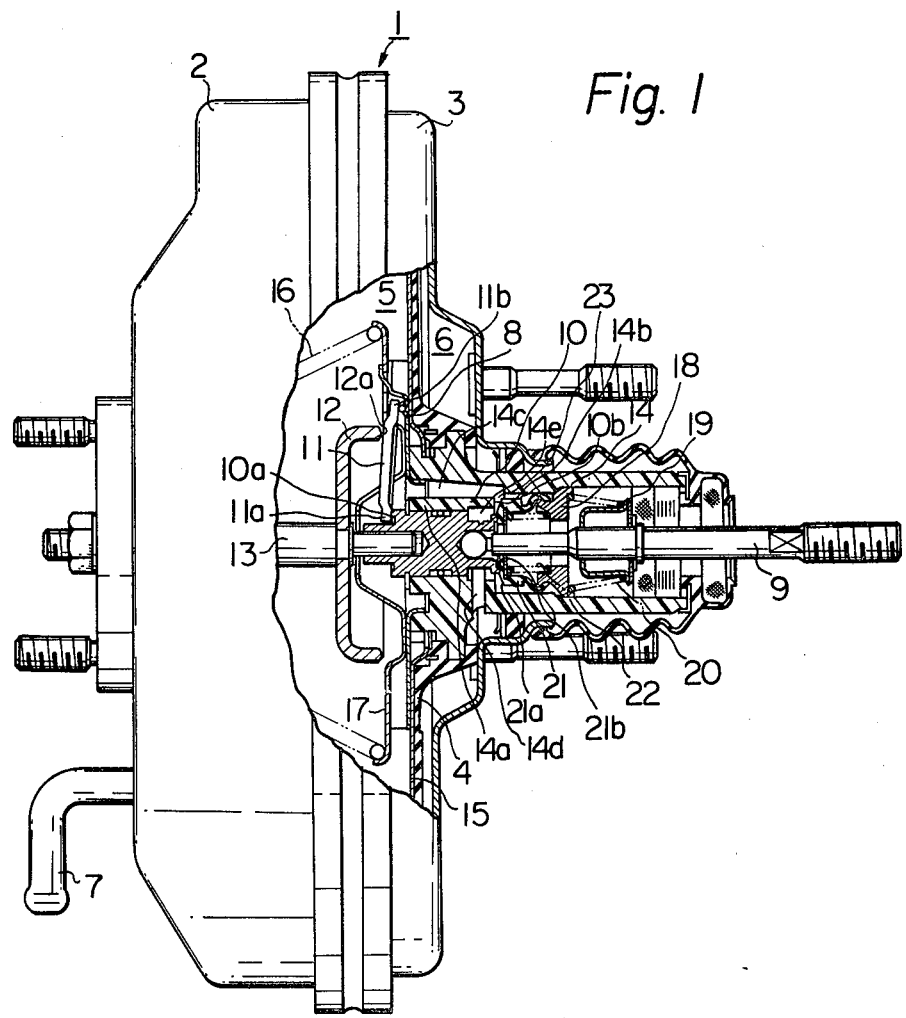
FIG. 1 is a longitudinal cross-sectional view of a vacuum booster according to the present invention.
Figure 2:
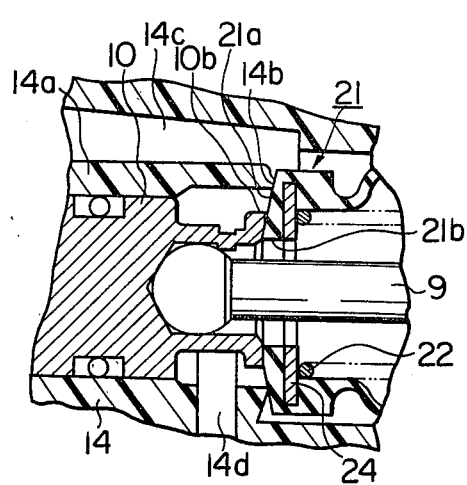
FIG. 2 is an enlarged cross-sectional view showing a portion of the booster of FIG. 1.

In FIGS. 1 and 2, a housing 1 of a vacuum booster comprises a front shell 2 and a rear shell 3 clamping therebetween a diaphragm 4 which divides the interior of the housing 1 into two chambers, i.e. a front or vacuum chamber 5 and a rear or atmospheric pressure chamber 6. A pipe 7 connects the front chamber 5 with a source of vacuum pressure such as an intake manifold of an engine of a vehicle.

An input rod 9 connected to a brake pedal (not shown) engages with a plunger 10 and moves it leftwards in the drawings during application of the brake. A shoulder portion 10a engages with one end 11a of a lever 11, the other end 11b of which engages with a plate 8 which in turn abuts a piston plate 15. An intermediate portion between the ends 11a and 11b of the lever 11 engages with an end 12a of a fulcrum plate 12 having a generally U-shaped cross-section. The fulcrum plate 12 is connected to an output rod 13.

The plunger 8 is slidably fitted in a cylinder portion 14a of a valve body 14 which is preferably formed of a material such as phenol resin. The valve body 14 sealingly engages with the inner periphery of the diaphragm 4 and has mounted thereon the piston plate 15 which extends along and supports the diaphragm 4. A return spring 16 acts on the piston plate 15 through a plate 17 to bias the piston plate 15 and the diaphragm 4 in the rightward direction in FIG. 1.

A retainer 18 is mounted in a longitudinal bore of the valve body 14 at a position intermediate the ends of the valve body for securing one end of a cylindrical valve member 21 according to the present invention. A spring 20 acts between the retainer 18 and a flange 19 formed integrally with the input rod 9 to bias the input rod 9 rightwardly in FIG. 1 (in the direction urging the input rod out of the housing).

The valve member 21 has a sealing surface or seating surface 21a and a bore 21b for passing the input rod 9 through at the other end thereof, and is extendable and biassed leftwards by a spring 22 acting between the retainer 18 and a backing plate 24 backing the seating surface 21a, whereby the surface 21a engages with an annular valve seat 10b formed on the adjacent end of the plunger 10 and an annular valve seat 14b formed as a shoulder defined in the bore of the valve body 14. Since the left end of valve member 21 is not guided in the valve body, it is free to move slightly radially as well as axially.

The valve seat 14b cooperates with the surface 21a to control communication between the pressure chamber 6 and the vacuum chamber 5, and the valve seat 10b cooperates with the surface 21a to control admission of atmospheric air into the pressure chamber 6. When the valve seat 14 moves apart from the seating surface 21a of the valve member 21 the vacuum chamber 5 communicates with the pressure chamber 6 through an axial passage 14c formed in the valve body, an annular space 14e defined in the cylinder portion 14a of the valve body 14 and a radial passage 14d formed in the valve body, and when the valve seat 10b moves apart from surface 21a atmospheric air flows into the pressure chamber 6 through the axial opening 21b of the valve body, the annular space 14e, and the radial passage 14d. In the balanced condition of the booster, the valve seats 14a and 10 engage simultaneously with the seating surface 21.

Now description will be given relating to the brake applying operation of a driver of a vehicle on which the vacuum booster is mounted. When the spring 20 is compressed by the thrust applied on the input rod 9, the plunger 10 and the seating surface 21a of the valve member 21 biased by the spring 22 will move leftward relative to the valve body 14, whereby the clearance 23 normally defined between the seating surface 21a and the annular valve seat 14b in the normal rest position is reduced. When the clearance 23 becomes zero, the communication between the vacuum chamber 5 and the pressure chamber 6 is blocked. When the input rod 9 moves further in the leftward direction, the valve seat 10b of the plunger 10 moves apart from the surface 21a thereby allowing admission of atmospheric air into the pressure chamber 6 through an annular space between the bore of the valve body 14 and the input rod 9, the annular space 14e and the radial passage 14d. A differential pressure will occur across the diaphragm 4 and between the chambers 5 and 6 and, an output force will be transmitted from the diaphragm 4 to the output rod 13 through the piston plate 15, the lever 11 and the fulcrum plate 12 for compressing the return spring 16.

In the balanced condition of the booster, when a given thrust is applied to the input rod 9, a corresponding output force is created in the output rod 13 and the forces acting on the opposite ends of the lever 11 will become balanced. At that time, the valve seats 10b, 14b of the plunger 10 and the valve body 14 engage respectively with the surface 21a.

Figure 7:
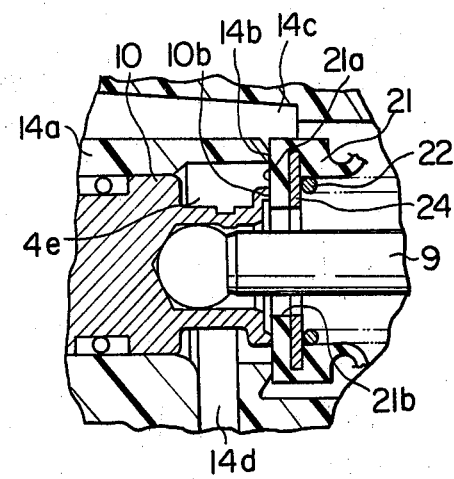
FIG. 7 is an enlarged fragmentary cross-sectional view of one conventional vacuum booster.

Since the surface 21a engages with both the valve seats 10b and 14b, there have been observed shortcomings in prior art vacuum boosters, in which the surface 21a is formed in a radial plane relative to the axis of the vacuum booster such as shown in FIG. 7, such that one or the other of the valve seats 10b and 14b will not be able to maintain a sealing engagement with the surface 21a when the plunger 10 is inclined relative to the valve body 14. Further, when a depression mark is caused in the surface 21a over a long period of usage, the plunger 10 or the valve member 21 will sometimes displace in the radial direction relative to the valve body, whereby sealing engagement will also be hindered.

Figure 8:
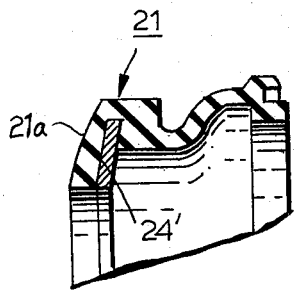
FIGS. 8 and 9 are fragmentary views of still further modified forms.
Figure 9:
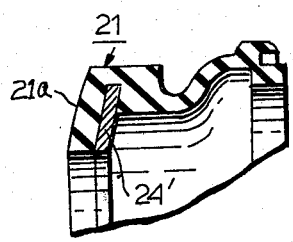

According to the present invention, the valve member 21 shown in FIGS. 1 and 2 comprises a seating surface 21a formed of a "curved surface". In this specification the term "curved surface" is intended to cover any surfaces which are not a flat plane surface, but surfaces other than the surfaces of revolution around the axis of the booster are excluded. The surface 21a shown in FIGS. 1 and 2 is a conical surface, but it may have other configurations such as a spherical surface, as shown in FIG. 8, or an ellipsoidal surface, as shown in FIG. 9, or the like. By forming the surface 21a in the shape of a surface of revolution, radial movement of the plunger 10 and/or the valve member 21 relative to the valve body 14 is prevented by engagement between the surface of revolution 21a and the valve seats 10b and 14b and, even though depression marks are formed in the contacting surfaces leakage will not occur.

Figure 3:
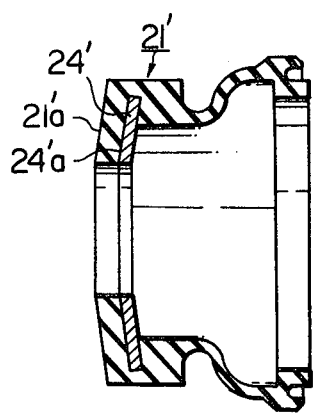
FIG. 3 is a cross-sectional view of a modified form of the sealing member used in FIGS. 1 and 2.

The valve member 21' shown in FIG. 3 is similar to the valve member 21 of FIG. 2. In the embodiment the backing plate 24' is formed so as to have a surface 24'a having configuration corresponding to the curved surface 21'a so that the resilient material in the surface 21'a has a uniform thickness which is effective in preventing the occurrance of depression marks in the surface 21'a.

Figure 4:
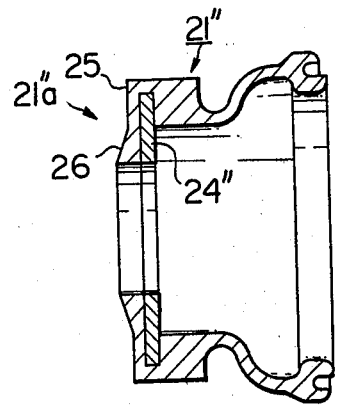
FIG. 4 is a view similar to FIG. 3 but showing another form of the sealing member used in FIGS. 1 and 2.

Only a part of the surface need be a surface of revolution. The valve member 21" shown in FIG. 4 is modified to have the seating surface 21"a composed of a plane surface portion 25 for engaging with the valve seat 14b of the valve body 14 and a conical surface portion 26 for engaging with the valve seat 10b of the plunger 10. The surface 21"a of this embodiment cooperates particularly with the valve seat 10b of the plunger 10 to maintain concentricity between the plunger 10 and the valve member 21".

Figure 5:
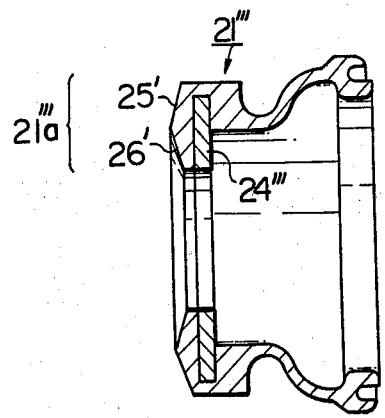
FIG. 5 is a view similar to FIG. 3 but showing a further modified form.
Figure 6A:
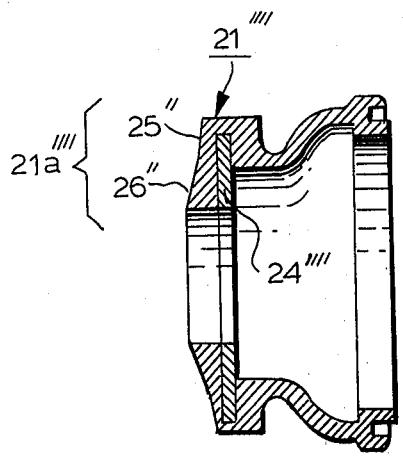
FIGS. 6a and 6b are views similar to FIG. 3 but showing still further modified forms.
Figure 6B:
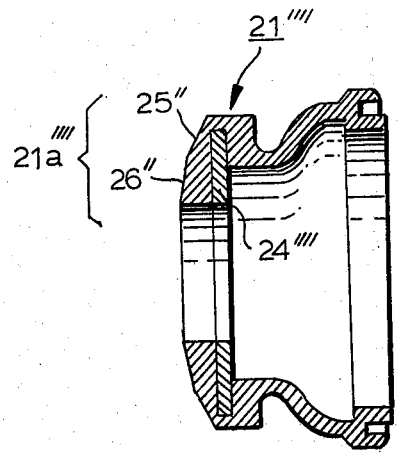

The surface can have portions which are different surfaces of revolution. In the valve member 21''' shown in FIG. 5, the seating surface 21'''a is further modified to have a convex surface portion 25' for engaging with the valve seat 14 of the valve body 14 and a concave surface portion 26' for engaging with the valve seat 10b of the plunger 10. The valve member 21'''' shown in FIGS. 6a and 6b has a seating surface 21''''a comprising surface portions 25" and 26" having different inclinations or curvatures.

The function and effects of the embodiments shown in FIGS. 3–6b are similar to those of the embodiment of FIGS. 1 and 2.

According to the present invention having the construction as hereinbefore described, the seating surface of the valve member is a surface at least part of which is a surface of revolution, the seating of the two valve seats against the seating surface in the balanced condition of the booster is effected reliably avoiding leakage between the valve seats and the seating surface of the valve member. Further, there can be provided other effects such that larger dimensional tolerance may become allowable with respect to the plunger and the valve body, thereby reducing manufacturing cost.

What is claimed is:

1. A vacuum booster comprising a housing having a movable wall therein dividing the housing into two chambers, a plunger slidably fitted in a cylinder portion of a valve body, valve seats defined respectively by one end of the plunger and one end of the cylinder portion of the valve body, and an axially extendable and contractive valve member one end of which is secured to the valve body and the other end of which is displaceable in radial and axial directions and defining a seating surface thereon for cooperating with the valve seats for controlling communication respectively between said two chambers defined in the housing and between at least one of the chambers and atmosphere, wherein at least one portion of the seating surface of the valve member with which at least one of said valve seats engages is formed of a surface of rotation around the axis of the valve member and is other than a flat plate radial surface.

2. A vacuum booster as set forth in claim 1 wherein said surface of rotation is a conical surface.

3. A vacuum booster as set forth in claim 1 wherein said surface of rotation is a spherical surface.

4. A vacuum booster as set forth in claim 1 wherein said surface of rotation is an ellipsoidal surface.

5. A vacuum booster as set forth in claim 1 wherein said valve seats engage with the surface of rotation of the valve member commonly.

6. A vacuum booster as set forth in claim 1 wherein said seating surface has two surface portions with which said valve seats engage respectively.

7. A vacuum booster as set forth in claim 6 wherein the seating surface has two conical portions, one engaging with the valve seat of the plunger and the other engaging with the valve seat of the valve body.

8. A vacuum booster as set forth in claim 7 in which both conical portions are convex with respect to a plane perpendicular to a longitudinal axis of the valve member and they are at different conical angles.

9. A vacuum booster as set forth in claim 7 in which one conical portion is convex with respect to a plane perpendicular to a longitudinal axis of the valve member and the other conical surface is concave with respect thereto.

10. A vacuum booster as claimed in claim 9 in which the convex conical surface is engaged with the valve seat of the valve body and the concave conical surface is engaged with the valve seat of the plunger.

11. A vacuum booster as claimed in claim 6 in which one surface portion is a surface of rotation and the other is a radial flat plane surface.

* * * * *